June 16, 1959  J. M. COOPER ET AL  2,890,844
AUTOMATIC AND MANUAL CONTROL APPARATUS FOR AIRCRAFT
Filed Oct. 28, 1954
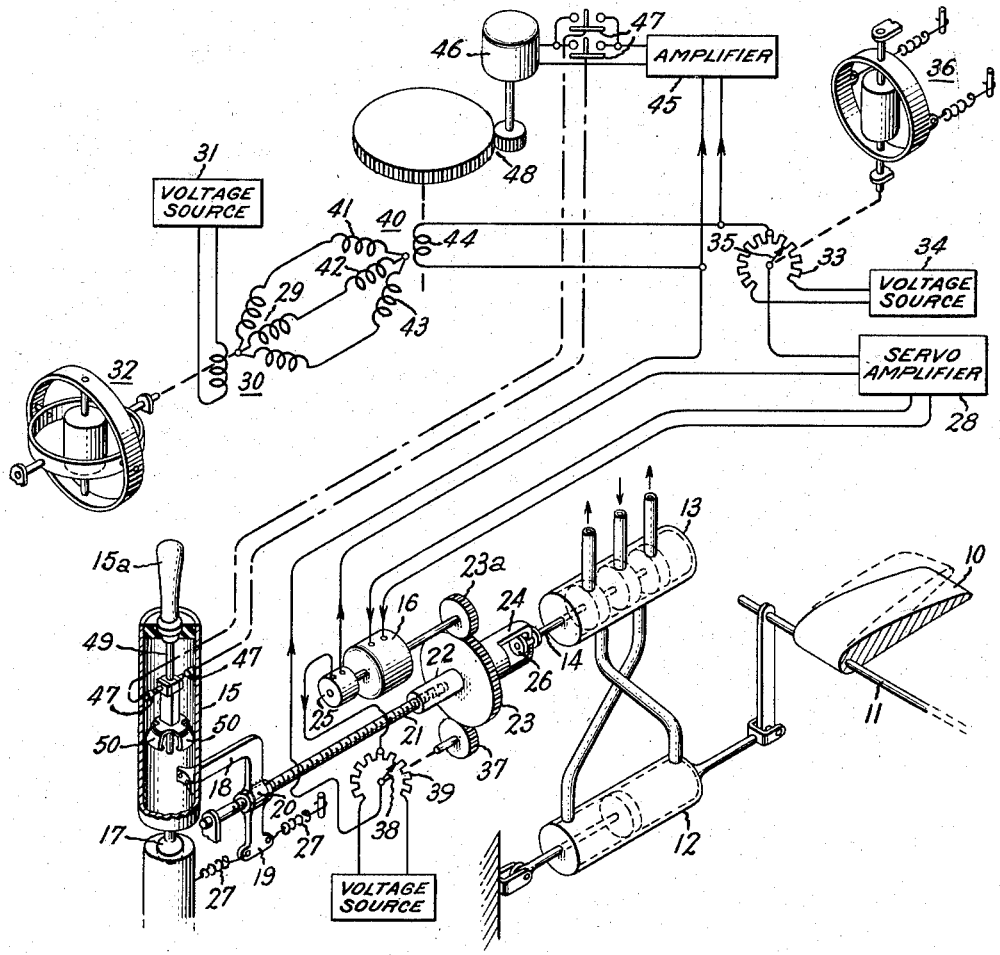
Inventors:
James M. Cooper,
Richard E. Bartholomew,
by  Claude N. Mott
Their Attorney.

United States Patent Office 2,890,844
Patented June 16, 1959

2,890,844

AUTOMATIC AND MANUAL CONTROL APPARATUS FOR AIRCRAFT

James M. Cooper, Schenectady, and Richard E. Bartholomew, Ballston Spa, N.Y., assignors to General Electric Company, a corporation of New York Application October 28, 1954, Serial No. 465,172

17 Claims. (Cl. 244—77)

This invention generally relates to improvements in maneuvering automatic pilots for navigable craft, and more particularly to an automatic pilot system having integrated, manually-operated controls and automatically-operated controls, for selectively and continuously controlling craft attitude and heading, either automatically or manually without interruption, by the exercise of a minimum number of controls.

Basic automatic control systems for stabilizing navigable craft, such as aircraft in flight, generally termed automatic pilots, oppose manual maneuvering of the aircraft by the human pilot. Since these systems are designed to maintain the aircraft in a predetermined heading and attitude, they naturally oppose all deviations of the aircraft from this attitude and heading without distinguishing unwanted deviations from desired manually-controlled maneuvers. As a result, prior automatic pilots have either been disengaged by the human pilot prior to and during maneuvers or modified to permit the human pilot to manually maneuver the aircraft while the automatic pilot is engaged, by introducing biasing signals into the automatic pilot system that continuously change the auto-pilot reference heading and attitude to the desired heading and attitude. However, manually disengaging the automatic pilot during maneuvers and then re-engaging the automatic pilot after maneuvers have been completed, is obviously unsatisfactory, requiring the human pilot's time and attention at a period when he is already over-burdened with the performing of a myriad of other controlling functions to be performed on present-day aircraft. On the other hand, maneuvering the aircraft through the automatic pilot by positioning a knob or lever that biases or changes the automatic pilot's pre-selected reference attitude to a new attitude is also considered unsatisfactory, since the forces and motions required to so bias the automatic pilot control in no way resemble the forces and actions normally needed to manually maneuver the craft through its conventional controllers. As a result, the human pilot loses the all-important "feel" of maneuvering. Moreover, providing simulators for supplying this "feel" artificially requires additional structure that is expensive, heavy, cumbersome, and not generally a satisfactory solution to this problem.

Contrasted with these prior systems, the present invention provides the human pilot with an integrated system for selectively controlling an aircraft by either the conventional manual controllers or by means of an automatic pilot, while providing a changeover from automatic to manual control that is both smooth and continuous. In accordance with this invention, the automatic pilot mechanism is normally in control of the aircraft. When the human pilot wishes to take over for manual maneuvers, he merely applies the usual forces to the conventional aircraft manual controller, such as the "joy" stick, and thereafter manually maneuvers and navigates the aircraft by means of these conventional controllers, as through an auto-pilot were not present, thereby preserving the "feel" of navigating the aircraft. By means of the present invention, the pressures or forces exerted on the manual controller by the human pilot actuate "force switches" that operate to automatically disable the auto-pilot during the manual maneuvers, as well as automatically synchronizing the automatic pilot by continuously changing its reference axis to coincide with the instantaneous desired actual heading and attitude axis of the aircraft. As a result of this disablement and synchronization, the auto-pilot does not oppose the desired maneuvers but is nevertheless maintained in constant readiness to again take over control of the aircraft, and upon the human pilot releasing the manual controller, the automatic pilot again resumes control, both smoothly and automatically, in a continuous operation, and thereafter stabilizes the aircraft at the heading and attitude selected by the human pilot at the time of his releasing this conventional manual controller.

It is accordingly one object of the invention to provide an improved maneuvering automatic pilot for navigable craft.

A further object is to provide a maneuvering automatic pilot for navigable craft, permitting changeover from automatic stabilization to manual maneuvering control, both smoothly and continuously.

A still further object is to provide a maneuvering automatic pilot that is less complex, less expensive, and simpler to operate than prior devices, while permitting substantially instantaneous changeover from automatic stabilization to manually controlled maneuvering, and automatic return to automatic stabilization at the selected attitude and heading desired by the human pilot.

A still further object of the invention is to provide an improved automatic pilot, permitting the human pilot to manually control the aircraft through the conventional aircraft controllers and enabling automatic resumption of the automatic pilot control at the aircraft attitude and heading assumed by the aircraft at the time the manual controllers have been released.

Other objects and many attendant advantages of this invention will be more readily comprehended by those skilled in this art from the following detailed description taken in conjunction with the accompanying drawing, schematically illustrating one embodiment of the invention, partially in block diagram form.

Referring now to the drawing, illustrating one preferred integrated apparatus incorporating the present invention, for selectively permitting both manual control and automatic control and stabilization of an aircraft about any one of its flight axes thereof, the aircraft control surface 10, such as the elevator or aileron, as shown, may be reversibly positioned by the shaft 11 by means of a conventional hydraulically driven power boost actuator 12, reversibly operated by a control valve 13 in response to movement of its valve stem 14. This valve stem 14 may be positioned either manually by a conventional "joy stick" or manual controller 15, having a hand-gripping handle 15a, or may be automatically positioned by a servo-motor 16 or other suitable actuator energized from an automatic pilot system, shown in the upper portion of the figure.

For manually controlling the position of control surface 10, the valve stem is preferably directly displaced by pivoting the human pilots manual controller 15 about its universal pivot joint 17. Displacing controller 15 positions an L-shaped link 18 connected thereto that is provided with a downwardly extending portion 19 having formed thereon in alignment with stem 14 a bearing 20, through which extends a threaded shaft or push-rod 21. Threaded shaft 21 is, in turn, threadably fastened at its opposite end within a sleeve 22, on which is mounted a spur gear 23. At the opposite end of sleeve 22 is connected a member 24 having two confronting teeth, rotatably engaging a spool 26 affixed to valve stem 14 so that sleeve 22 cannot move axially or lengthwise with respect to the valve stem 14, although the two members can rotate with respect to each other. Thus, pivotal movement of the manual controller 15 directly positions valve stem 14 into and out of the valve through the connecting mechanism comprising L-shaped member 18, push-rod 21, sleeve 22, and spool 26.

Meshing with the spur gear 23 and positioned above this gear is a second spur gear 23a driven by the servo-motor 16. Upon rotation of servo-motor 16, the spur gear 23a drives gear 23 and sleeve 22 connected thereto, causing threaded sleeve 22 to be drawn up onto or further off of the threads of push-rod 21, thereby either shortening the effective length of push-rod 21 or lengthening the effective length thereof, and correspondingly moving valve stem 14 into or out of control valve 13. In other words, push-rod 21, sleeve 22, and valve stem 14 form a mechanical linkage which is expandable and contractable in response to rotation of servo-motor 16, thereby moving valve stem 14 into and out of control valve 13 in response to the rotation of the servo-motor 16.

Thus it is observed that valve 14 may be displaced to control the position of the craft surface 10 by either manually displacing pilot's hand-controller 15 or by electrically energizing servo-motor 16 to cause rotation thereof. Manual displacement of the pilot's hand-controller results in the axial or longitudinal movement of the entire linkage interconnecting the hand-controller 15 and valve stem 14, whereas electric energization of servo-motor 16 results in the length of this interconnecting linkage being either lengthened or shortened to further withdraw or insert valve stem 14 into control valve 13. To prevent interaction between these two alternately acting positioning devices, the hand controller 15 and related linkage is provided with an adjustable centering device such as the two centering springs 27, one on either side of the downwardly extending portions 19 of L-shaped member 18, which act in opposition to oppose longitudinal movement of this hand controller and push-rod linkage and thereby normally center this linkage. Since the force provided by the centering springs 27 is much greater than the force needed to position valve 14 into and out of valve 13, the expansion and contraction of the push-rod 21 into and out of sleeve 22 in response to rotation of servo-motor 16 is not reflected back to the manual controller 15, but merely positions valve stem 14 in and out of control valve 13, leaving the manual controller 15 in its centered position. In other words, rotation of the servo-motor 16 does not move the push-rod 21 axially, but merely threads the sleeve 22 further onto the push-rod or further off the push-rod, thereby positioning the valve stem 14 without any following movement of the manual controller 15.

Servo-motor 16 may be energized by any of the known automatic pilot or stabilizing system components, and for purposes of illustration is shown as being energized by the output of a servo-amplifier 28, in response to the resultant sum of a plurality of electrical control signals connected in series to energize this servo-amplifier input.

The first of these signals is directed from the secondary winding 29 of a selsyn transmitter 30, whose primary winding is energized by voltage source 31. This selsyn transmitter may be manually positioned in accordance with the deviation of the aircraft about a selected reference control axis by a suitably oriented "position" gyro, such as a vertical gyro, as shown, generally designated 32. Signals are generated from this secondary winding proportional to the deviation of the aircraft about a selected reference control axis. A second of these controlling signals is preferably derived from a potentiometer 33 energized by voltage source 34 and having its movable slider 35 mechanically positioned by a suitably oriented rate gyro 36 or the like, and generating an electrical signal proportional to the rate of deviation of the aircraft about a control axis. Thus, by means of these two gyros, the aircraft may be automatically stabilized about a predetermined axis for "position" deviation, and additionally corrected for transient "rate" motion about a control axis thereof.

As also known in the auto-pilot art, either or both "rate" feedback and "position" feedback may be employed in this auto-pilot system, as shown, by providing a tachometer 25 connected to be driven by servo-motor 16 and generating a signal degeneratively to said servo amplifier 28 proportional to the rate of movement of servo-motor 16. Position follow-up may also be obtained, as shown, by providing a third spur gear 37 meshing with spur gear 23 and driven thereby, and in turn driving a slider 38 of an energized potentiometer 39, in accordance with the positioning of servo-motor 16, thereby generating a position feedback signal to the servo-amplifier 28 in opposition to the signals provided by the "position" gyro 32 and/or rate gyro 36.

Now, for selectively controlling the aircraft by either the above-described manual controller or automatic pilot, as desired by the human pilot, a second synchronizing selsyn, generally designated 40, is provided in the automatic pilot electrical circuit, in back-to-back connection, with the gyro-driven selsyn 30, by means of connecting each one of its three stator windings 41, 42, 43 in a series circuit with the corresponding windings of the stator of gyro selsyn 30. Considering the gyro selsyn 30 as a selsyn transmitter and selsyn 40 as a differential selsyn, the operation of these cascaded devices is well known in the art and perform as follows. The output signals from the winding of stator 29 of gyro selsyn 30 are proportional to the displacement of its rotor from its stator position. These signals being transmitted to windings 41, 42 and 43 induce a voltage in the rotor 44 of the second selsyn proportional to the degree of alignment of the gyro drive rotor and rotor 44. If both rotors are in alignment, this signal is at its maximum value, but if these rotors are misaligned in space by 90 degrees, this signal is zero. Thus, the resultant signal generated by rotor 44 is proportional to the relative displacement between the gyro rotor and the selsyn rotor 44; and therefore, by changing the angular position of rotor 44, a new gyro reference position is in effect obtained.

For rotating rotor 44 so that its position corresponds to the instantaneous attitude of the aircraft, a follow-up servo is provided, including an amplifier circuit 45 responsive to the output signal from rotor 44 and driving a synchronizing motor 46 through switch contacts 47, which motor drives or positions rotor 44 through a suitable gear train 48. Assuming either one of switch contacts 47 is closed, rotor 44 is therefore positioned by motor 46 until its ouput is zero; or in other words, until it is displaced 90 degrees from the position of the gyro-driven rotor of selsyn 30. Since the position of the gyro-driven selsyn rotor is proportional to the actual heading of the aircraft, and the position of rotor 44 represents the reference control axis, this follow-up and servo in effect continuously change the reference axis of the auto-pilot to coincide with the actual axis of the aircraft as the aircraft is maneuvered. However, as soon as switch contacts 47 are opened, the position of rotor 44 remains fixed, and an electrical signal is generated from this rotor to the servo-amplifier 28 proportional to the deviation of the aircraft from the reference axis as now established by the position of rotor 44. Thus this mechanism, in effect, disables the gyro 32 from transmitting signals to the auto-pilot in opposition to the manual control of the aircraft, during manually controlled maneuvers thereof, by changing the gyro reference position to the actual position of the aircraft during the maneuvers.

For permitting the human pilot to exercise control of these selective means at will, without being required to perform any additional functions, switches 47 are operated in response to "forces" applied to the handle 15a of the manual controller 15. As shown, this handle is preferably connected to a shaft 49 which may be spring mounted within the cylindrically-formed controller by the concentrically-arranged centering spring fingers 50. On opposite sides of the shaft 49 are connected one contact of each of the switches 47, and the mating contacts thereof are connected to the adjacent inner portions of controller cylinder 15. As the human pilot grasps the handle 15a of manual controller 15, preparatory to executing the desired maneuvers, the "force" applied to the handle 15a displaces shaft 49 against centering spring 50, and closes one or the other of switch contacts 47, dependent upon the direction of movement of the manual controller 15. The auto-pilot synchronizing motor 46 is thereupon energized by amplifier 45 and, through gear-train 48, drives selsyn rotor 44 to a position nullifying the output of gyro-driven selsyn 30, thereby automatically synchronizing the output of this gyro by establishing a new reference axis in accordance with the new position of the aircraft. Thereafter, the human pilot manually executes the aircraft maneuvers, unopposed by the "position" gyro signals for, as long as the handle 15a of manual controller 15 is operated, the automatic synchronizing motor continuously drives rotor 44 of selsyn 40 to nullify the output of the position gyro by effectively changing the reference axis of the auto-pilot to coincide with the actual axis of the aircraft.

Once the pilot has completed the desired maneuver and placed the aircraft in the new desired heading and attitude, he releases the controller handle 15a. After releasing the controller handle 15a, the controller centering springs 27 automatically return the manual controller shaft to its zero position, and the "force switch" centering springs 50 automatically return the "force switch" handle 15a to its center position, opening switches 47. As soon as switches 47 are open, the synchronizing motor 46 is de-energized and the position of the synchronizing selsyn rotor 44 is fixed at the desired aircraft attitude axis. Thereafter, the signals from position gyro 32 are directed through selsyns 30 and 40 to energize servo-amplifier 28, and thereby automatically stabilize the attitude of the aircraft to the newly selected position established by the human pilot.

Many variations to the specific apparatus illustrated and described may be readily made by those skilled in the art in accordance with the basic invention herein disclosed without departing from the spirit and scope of this invention, and therefore this invention should be considered as limited only in accordance with the features thereof as set forth in the claims appended hereto.

What we claim as new and desire to secure by Letters Patent of the United States is:

1. In a craft having a control surface and means for both automatically and manually positioning said surface in accordance with either a signal receiving actuator or with movement of a manual controller, said signal-receiving actuator being energized by a signal generator responsive to deviation of the craft about a control axis, means energized by said signal generator and adapted to nullify the energization produced by said signal generator, and switching means responsive to a force applied to said manual controller for actuating said nullifying means, said manual controller including a rigid member operatively coupled to said control surface and a handle member movably supported thereto by spring biasing and displaceable therefrom by a manual force, and said switching means being intermediate said rigid member and handle member and actuated upon displacement of said handle member.

2. In a craft having a control surface and means for both automatically and manually positioning said surface in accordance with either a signal-receiving actuator or with movement of a manual controller, said signal-receiving actuator being energized by a signal generator responsive to deviation of the craft from a given position referenced to the earth, means energized by said signal generator and adapted to nullify the energization produced by said signal generator, and switching means responsive to a force applied to said manual controller for actuating said nullifying means, said manual controller including a rigid member operatively coupled to said control surface and a handle member movably supported thereto by spring biasing and displaceable therefrom by a manual force, and said switching means being intermediate said rigid member and handle member and actuated upon displacement of said handle member.

3. In a craft having a control surface and means for both automatically and manually positioning said surface in accordance with either a signal receiving actuator or with movement of a manual controller, said signal receiving actuator being energized by a signal generator responsive to deviation of the craft about a control axis from a predetermined reference position, means energized by said signal generator and adapted to nullify the energization produced by said signal generator by varying said predetermined position to coincide with the actual position of said craft, and switching means responsive to a manual force applied to said controller for activating said nullifying means and for deactivating said nullifying means upon the removal of said manual force, said manual controller including a rigid member operatively coupled to said control surface and a handle member supported thereto by spring biasing and displaceable therefrom by manual force, and said switching means being intermediate said rigid member and handle member and actuated upon displacement of said handle member.

4. In a craft having a control surface and means for both automatically and manually positioning said surface in accordance with either a signal receiving actuator or with movement of a manual controller, a signal generator responsive to deviation of the craft about a control axis from a predetermined reference position for energizing said actuator, means energized by said signal generator and adapted to vary said predetermined reference position, and switching means responsive to a manual force applied to said controller for engaging said varying means and responsive to removal of said manual force for disengaging said varying means, whereby upon removal of said manual force from said controller, said reference position coincides with the then position of the aircraft, said manual controller including a rigid member operatively coupled to said control surface and a handle member supported thereto by spring biasing and displaceable therefrom by a manual force, and said switching means intermediate said rigid member and handle member and actuated upon displacement of said handle member.

5. In a craft having a control surface positioned by an actuator, integrated means coupled to said actuator for both stabilizing the craft position and rate of movement and manually maneuvering said craft by means of a manual controller, said stabilizing means including a position maintaining means energizing said actuator in accordance with deviation of the aircraft about a control axis from a predetermined position, and including a means responsive to said position maintaining means and adapted to substantially instantaneously change said predetermined position to the actual position of the aircraft, and switching means responsive to a force applied to said manual controller for activating said predetermined position changing means, said manual controller including a rigid member operatively coupled to said control surface and a handle member supported thereto by spring biasing, and displaceable therefrom by a manual force, and said switching means being intermediate said rigid member and handle member and actuated upon displacement of said handle member.

6. In a craft having a control surface positioned by an actuator, integrated means coupled to said actuator for both stabilizing the craft position and rate of movement and manually maneuvering said craft by means of a manual controller, said stabilizing means including a position maintaining means energizing said actuator in accordance with deviation of the aircraft about a control axis from a predetermined position, and including a means responsive to said position maintaining means and adapted to substantially instantaneously change said predetermined position to the actual position of the aircraft, and switching means responsive to a force applied to said manual controller for activating said predetermined position changing means, said manual controller including a rigid member operatively coupled to said control surface and a handle member supported thereto by spring biasing, and displaceable therefrom by a manual force, and said switching means being intermediate said rigid member and handle member and actuated upon displacement of said handle member, whereby upon the application of said manual force to said controller, said position maintaining means is substantially nullified and, upon removal of said manual force from said controller, said craft is stabilized about the position of the craft at the time of removing said manual force.

7. In a craft having a control surface positioned by an actuator, integrated means coupled to said actuator for both stabilizing the craft position and rate of movement and manually maneuvering said craft by means of a manual controller, said stabilizing means including a position maintaining means energizing said actuator in accordance with deviation of the aircraft about a control axis from a predetermined position, and including a means responsive to said position maintaining means and adapted to substantially instantaneously change said predetermined position to the actual position of the aircraft, and switching means responsive to a force applied to said manual controller for activating said predetermined position changing means, said manual controller including a rigid member operatively coupled to said control surface through said actuator, and a handle member supported thereto by spring biasing and displaceable therefrom by a manual force, and said switching means being intermediate said rigid member and handle member and actuated upon displacement of said handle member, and a rate means energizing said actuator in accordance with the rate of craft deviation.

8. In a craft having a control surface positioned by an actuator, integrated means coupled to said actuator for both stabilizing the craft position and rate of movement and manually maneuvering said craft by means of a manual controller, said stabilizing means including a position maintaining means energizing said actuator in accordance with deviation of the aircraft about a control axis from a predetermined position, and including a means responsive to said position maintaining means and adapted to substantially instantaneously change said predetermined position to the actual position of the aircraft, and switching means responsive to a force applied to said manual controller for activating said predetermined position changing means, said manual controller including a rigid member operatively coupled to said control surface and a handle member supported thereto by spring biasing, and displaceable therefrom by a manual force, and said switching means being intermediate said rigid member and handle member and actuated upon displacement of said handle member.

9. In a craft having a control surface positioned by an actuator, integrated means coupled to said actuator for both stabilizing the craft position and rate of movement and enabling manually maneuvering said craft by means of a manual controller, said stabilizing means including a position maintaining means energizing said actuator in accordance with deviation of the aircraft about a control axis from a predetermined position, and including a means responsive to said position maintaining means and adapted to substantially instantaneously change said predetermined position to the actual position of the aircraft, and switching means responsive to a force applied to said manual controller for activating said predetermined position changing means, said manual controller including a rigid member operatively coupled to said control surface and a handle member supported thereto by spring biasing, and displaceable therefrom by a manual force, and said switching means being intermediate said rigid member and handle member and actuated upon displacement of said handle member, and a rate means energizing said actuator in accordance with the rate of deviation of the aircraft about said control axis.

10. In an aircraft having a control surface and a means for positioning said control surface in response to manual positioning of a member by a manually operable controller, automatic pilot means continuously connected to said member for additionally positioning said member, said automatic pilot means including a signal responsive means for controlling said member position in accordance with the deviation of the aircraft about a control axis thereof, means adapted to nullify said signal responsive means, and switching means responsive to a force applied to said manual controller for activating said nullifying means, whereby said craft is selectively controlled by said auto-pilot or said manual controller upon the application and removal of forces to said manual controller.

11. Means for integrating manual positioning of a movable surface with automatic positioning of such surface, said means including a linkage continuously coupled to said surface, a manual controller directly and continuously coupled to position said linkage, a signal responsive means continuously coupled to said linkage for varying the position of said movable surface, a signal generating means for energizing said signal responsive means, means responsive to said signal generating means and adapted to nullify the signal generated thereby, and switching means responsive to a manual force applied to said controller for actuating said nullifying means whereby prior to the application of said manual force said surface position is controlled by said signal generating means and upon the application of said force said surface position is independent of said generating means.

12. Means for integrating the manual positioning of a movable surface with the automatic positioning of said surface, said means including a linkage continuously coupled to said surface, a manual controller directly and continuously coupled to position said linkage, a signal responsive actuating means continuously coupled to said linkage for varying the position of said movable surface, a first signal generating means for energizing said signal responsive means, a second signal generating means for energizing said signal responsive means, means responsive to said first signal generating means and adapted to nullify the signal generated thereby, and switching means responsive to a manual force applied to said controller for actuating said nullifying means whereby prior to the application of said manual force said surface position is controlled by said signal generating means and upon the application of said force said surface position is independent of said first signal generating means and responsive to said second generating means and movement of said manual controller.

13. In a device for selectively positioning a movable member by either a manual controller or by automatically operating means, a linkage operatively and continuously interconnecting said manual controller and member for positioning said member with movement of the controller, a signal responsive positioning means associated with a portion of said linkage for positioning said member independently of movement of said manual controller, a signal generating means energizing said signal responsive positioning means, means responsive to said signal generating means and adapted to nullify the signal generated thereby, and switching means responsive to a manually applied force exerted upon said controller for actuating said nullifying means.

14. In a device for selectively positioning a movable member by either a manual controller or by automatically operating means, a linkage operatively and continuously interconnecting said manual controller and member for positioning said member with movement of the controller, a signal responsive positioning means associated with a portion of said linkage for positioning said member independently of movement of said manual controller, a first signal generating means energizing said signal responsive positioning means, a second signal generating means energizing said signal responsive positioning means, means responsive to said first signal generating means and adapted to nullify the signal generated thereby, and switching means responsive to a manually applied force exerted upon said controller for actuating said nullifying means.

15. In a craft having a control surface, a movable member operatively connected to said control surface to enable positioning of said control surface, a manual controller continuously connected to said member to permit movement of said member with manual movement of said controller, a signal responsive actuator continuously connected to said member to permit movement of said member in response to signals received thereby, a signal generating means having an output for energizing said actuator, means adapted to continuously nullify the output of said signal generating means, and a switching means responsive to the application of a manually applied force upon said controller for actuating said nullifying means.

16. In a craft having a control surface, a movable member operatively connected to said control surface to enable positioning of said control surface, a manual controller continuously connected to said member to permit movement of said member with manual movement of said controller, a signal responsive actuator continuously connected to said member to permit movement of said member in response to signals received thereby, a first signal generating means having an output energizing said actuator, a second signal generating means having an output energizing said actuator, means responsive to said first signal generating means and adapted to continuously nullify the output of said first signal generating means, and a switching means responsive to the application of a manually applied force upon said controller for actuating said nullifying means.

17. In a device of claim 16, said member being comprised of a variable length linkage means, and said manually operated controller adapted to position said linkage, and said signal responsive actuator adapted to vary the length of said linkage to position said control surface without positioning said manual controller.

References Cited in the file of this patent

UNITED STATES PATENTS

| | | |
|---|---|---|
| 1,203,221 | Macy | Oct. 31, 1916 |
| 1,418,335 | Sperry | June 6, 1922 |
| 2,429,642 | Newton | Oct. 28, 1947 |
| 2,487,793 | Esval | Nov. 15, 1949 |
| 2,589,834 | MacCallum | Mar. 18, 1952 |
| 2,611,559 | Meredith | Sept. 23, 1952 |
| 2,707,085 | Strother | Apr. 26, 1955 |
| 2,764,370 | Yates | Sept. 25, 1956 |